United States Patent [19]
Segre

[11] 3,798,571
[45] Mar. 19, 1974

[54] SLAB LASER SYSTEM WITH MEANS TO OVERCOME THE POSITIVE LENS EFFECT CAUSED BY THE THERMAL GRADIENT IN THE LASER ROD

[75] Inventor: Joseph P. Segre, Acton, Mass.

[73] Assignee: American Optical Corporation, Southbridge, Mass.

[22] Filed: June 9, 1969

[21] Appl. No.: 831,657

[52] U.S. Cl............................................ 331/94.5 T
[51] Int. Cl............................................. H01s 3/05
[58] Field of Search ...................... 331/94.5, 94.5 T

[56] References Cited
UNITED STATES PATENTS
3,484,714  12/1969  Koester et al.................... 331/94.5

Primary Examiner—Ronald L. Wibert
Assistant Examiner—V. P. McGraw
Attorney, Agent, or Firm—William C. Nealon

[57] ABSTRACT

In a glass laser system, the laser glass is in the shape of an elongated slab, which is excited by being irradiated through the larger sidewalls thereof. A calcite block plate in combination with quarter and half wave plates laterally shift the laser rays in the laser cavity to compensate for a positive lens effect caused by one dimensional thermal gradient in the laser glass. The calcite block and quarter and half wave plates also function to polarize the laser rays to have their E vectors parallel with the larger sidewalls of the slab.

14 Claims, 2 Drawing Figures

INVENTOR
JOSEPH P. SEGRÈ

BY Lane, Aitken, Dunner & Ziems
ATTORNEYS

SLAB LASER SYSTEM WITH MEANS TO OVERCOME THE POSITIVE LENS EFFECT CAUSED BY THE THERMAL GRADIENT IN THE LASER ROD

BACKGROUND OF THE INVENTION

This invention relates to glass laser systems and, more particularly, to a glass laser system with means to overcome the positive lens effect which arises from the thermal gradient in the laser rod.

A conventional laser is excited to a state in which it will amplify light by periodically or continuously illuminating the rod with high intensity flashlamps. This excitation process is called pumping and the light which excites the laser material is called pump light. The light which the laser material amplifies is called laser light.

The pumping of a glass laser rod introduces heat into the rod approximately uniformly per unit volume throughout the rod. Yet heat is extracted from the rod only from the surface of the rod. As a result, in a round glass laser rod of the conventional configuration having an external length much longer than its diameter, a radial thermal gradient is built up. The radial thermal gradient results in a radial gradient in the index of refraction within the laser rod with the index being higher at the center of the rod than it is at the surface of the rod. As a result, the rod acts as a positive lens upon the laser beam and operates to focus on the laser beam in the center of the laser rod.

The focusing of the laser beam by the laser rod is undesirable because the volume in which the laser action takes place is reduced thus reducing the efficiency of the rod. Moreover, the spread of the laser beam produced by the rod is increased. In most laser applications, minimum beam spread is desired at the target receiving the laser beam in order to deliver maximum energy to the target. In addition, because of the positive lens action of the laser rod, the laser beam can collapse into a destructive filament as a result of self-focusing of the laser beam. Self-focusing of a laser beam causing the laser beam to collapse into a destructive filament occurs because the index of refraction in material, in general, is increased by the high intensity electric field present in the laser beam. The intensity of a laser beam is usually highest in the center and varies with a gaussian distribution from the center outwardly. As a result, the index of refraction in general will be higher at the center of the medium through which the beam is passing than it will at the edge. If the increase in the index of refraction with the electric field in the laser beam is high enough, the beam will collapse due to the resulting dynamic positive lensing effect into a diffraction limited filament. At this point, the power density in the laser beam will exceed the damage threshold of the material and a fine fossil record is left where the laser beam passes through the material. The self-focusing resulting in the laser beam collapse will occur at a much lower threshold when even a small amount of positive lens power is initially present in the material. Thus, the presence of the thermal radial gradient will lower the threshold at which this beam collapse occurs.

In the glass lasers of the prior art, a number of approaches have been employed to overcome the problem of thermal lensing such as introducing into the cavity negative lenses to counteract the positive lens effect of the thermal gradient. This method of compensation has the disadvantage that it compensates for only one set of operating conditions. A zoom telescope could be used in the laser cavity to counteract the effects of thermal lensing but the telescope requires continuous resetting as the operating conditions change.

SUMMARY OF THE INVENTION

The present invention provides an entirely different approach to the problem of thermal lensing. In accordance with the present invention, the laser glass instead of being in the shape of a round rod is in the form of an oblong slab which is pumped by means of flashlamps located opposite the larger sidewalls of the slab. As a result, the thermal gradient which is produced in the laser glass of the slab is approximately one dimensional in that it approaches the condition of having the locus of the maximum temperature in a plane parallel to the larger sidewalls of the slab passing through the middle of the slab. The temperature gradient decreases from the high temperature plane toward the larger sidewalls of the slab. As a result, the slab acts like a positive cylindrical lens tending to focus the laser light toward the high temperature plane in the middle of the slab. In accordance with the present invention, means are provided to cause the laser rays to pass alternately through opposite sides of the slab in a manner so that the rays near the central high temperature plane in one side of the slab are near the large sidewall in the other side of the slab and vice versa. As a result, each ray passes through material of a relatively high index of refraction in one side of the slab and through material of a relatively low index of refraction in the other side of the slab and in this manner the lens power of the slab is cancelled out.

In a slab laser, the minimum beam divergence is achieved for laser rays polarized so that their electric field vectors are parallel to the larger sidewalls of the slab. The ray transferring means also operates to transfer rays which do not have such polarization out of the cavity. Thus, the system of the present invention also reduces beam divergence in a slab laser system.

Accordingly, an object of the present invention is to provide an improved glass laser system.

Another object of the present invention is to overcome the problem of thermal lensing in a glass laser system.

A further object of the present invention is to provide a laser system in which the problem of thermal lensing is overcome.

A still further object of the present invention is to overcome the one dimensional thermal gradient that is produced in a slab type laser system.

A further object of the present invention is to minimize beam divergence in a slab laser system.

Further objects and advantages of the invention will become readily apparent as the following description of a preferred embodiment unfolds and when taken in conjunction with the accompanying drawings.

DESCRIPTION OF THE SPECIFIC EMBODIMENT

Figure 1:
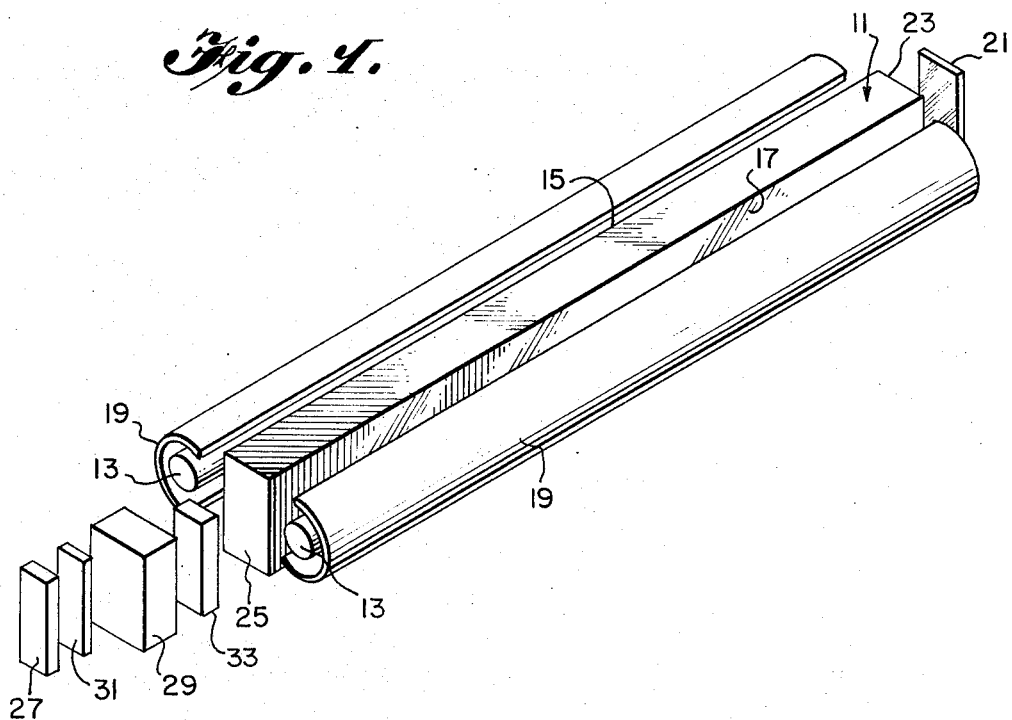
FIG. 1 is a schematic perspective view of the laser system of the present invention; and, FIG. 2 is an enlarged plan view of a portion of the system shown in FIG. 1.
Figure 2:
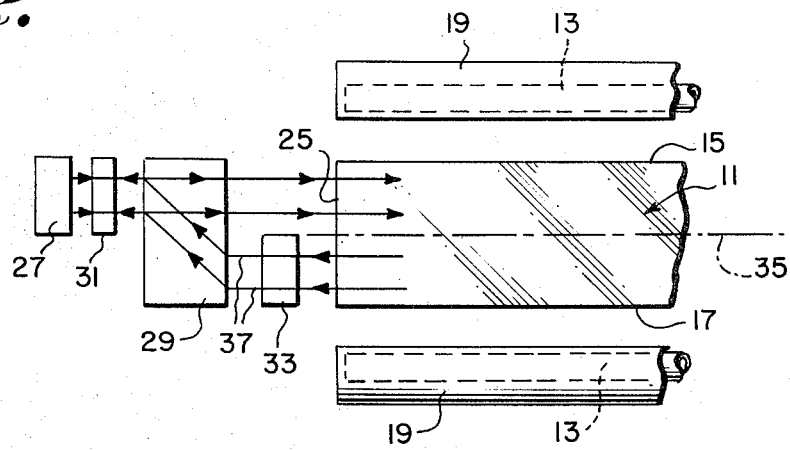

As shown in FIGS. 1 and 2, the laser system of the present invention comprises an elongated oblong slab 11 of laser glass, such as glass doped with neodymium. Positioned on each side of the slab 11 are inert gas flashlamps 13 for irradiating the slab 11 through the large sidewalls 15 and 17 facing the flashlamps 13. Reflectors 19 are provided around the flashlamps 13 to increase the intensity of the light generated by the flashlamps entering the slab 11. A mirror 21 is provided opposite the end face 23 of the slab to reflect the light leaving the slab 11 through the end face 23 back into the slab 11. Opposite the other end face 25 of the slab 11 is a mirror 27, a calcite plate 29, a quarter wave plate 31 and a half wave plate 33. The calcite plate 29 is positioned between the mirror 27 and the end face 25. The quarter wave plate 31 is positioned between the calcite plate 29 and the mirror 27 and the half wave plate 33 is positioned between the calcite plate 29 and the end face 25. The mirror 27 reflects laser rays passing out of the slab 11 through the end face 25 back into the slab 11 after these rays have passed through the calcite plate 29 and the quarter and half wave plates 31 and 33 in a manner to be described.

In FIG. 2, the reference number 35 designates a plane passing through the middle of the slab 11 parallel with the sidewalls 15 and 17 of the slab 11. The half wave plate 33 is only as wide as half the end face 25 of the slab 11 and is positioned between the plane 35 and the plane of the sidewall 17. The quarter wave plate 31 and the mirror 27 are also only half as wide as the end face 25 and are positioned between the plane 35 an the plane of the sidewall 15. The half and quarter wave plates 31 and 33 and the mirror 27 all have a height equal to the height of the slab 11. The height and width of the calcite plate 29 are equal to the height and width of the slab 11.

When the flashlamps 13 irradiate the slab 11, the laser glass of the slab 11 becomes excited and will emit light of a particular wave length characteristic of the laser glass of the slab. For laser glass doped with neodymium, this wavelength is 1.06 microns. Laser light emitted by the slab 11 upon travelling through the slab 11 will be amplified by the slab 11. That portion of the laser light which travels through the slab 11 parallel to the longitudinal dimension of the slab 11, or in other words, parallel to an axis running longitudinally through the slab 11 at the symmetrical center thereof is referred to as axial light. Axial laser light after passing through the end faces 23 and 25 will be reflected back into the slab 11 by the mirrors 21 and 27 for further amplification. As a result, a standing wave of laser light will be set up between the mirrors 21 and 27, which standing wave is referred to as laser oscillations. The mirrors 21 and 27 are said to define a laser cavity. Non-axial laser light emitted within the slab 11 will not be reflected back into the slab 11 by the mirrors and thus will be eliminated from the system without substantially affecting the degree of excitation of the laser glass. The mirror 21 is made partially transmissive to permit the laser energy to be transmitted as a beam to a utilization device.

In a laser rod having a slab configuration, axial laser rays, polarized so that they have their electric field vector parallel to the long dimension of the end face of the slab, will have the lowest beam divergence. Hereinafter, the electric field vector is referred to as the E vector. In the slab 11, axial laser rays, which are polarized so that their E vector is perpendicular to the plane of the paper as viewed in FIG. 2, will have the lowest beam divergence. Since minimum beam divergence is desired, the polarization desired for the laser oscillations is with the E vector perpendicular to the paper as viewed in FIG. 2. When an axial laser ray between the plane 35 and the sidewall 17 passes out of the slab through the end face 25, it will first pass through the half wave plate 33, which will rotate the polarization of the laser ray 90°. If the ray has the desired polarization described above, the ray, after passing through the half wave plate 33, will have a polarization parallel to the plane of the paper as seen in FIG. 2. The calcite plate 29 is oriented so that the ray with such polarization in the calcite plate is what is referred to as an extraordinary ray and the calcite plate 29 will shift the ray laterally to the other side of the plane 35. The calcite plate is designed so that the amount that the ray is shifted laterally in the calcite plate is equal to one half the thickness of the slab 11. Upon leaving the calcite plate, the direction of the ray is again returned to axial. The ray, after being laterally shifted by the calcite plate 29, then will pass through the quarter wave plate 31 to the reflector 27, which will reflect the ray back through the quarter wave plate 31 into the calcite plate 29. On each pass through the quarter wave plate 31, the ray will have its polarization rotated 45 degrees so that the plane of the polarization of the ray upon re-entering the calcite plate 29 will again have a plane of polarization perpendicular to the paper as seen in FIG. 2. A ray with this polarization is an ordinary ray in the calcite plate and will travel through the calcite plate without being laterally shifted. The ray will thus enter the slab 11 through the end face 25 on the side thereof between the plane 35 and the sidewall 15. In this manner, the calcite plate 29, the quarter wave plate 31 and the half wave plate 33 together with the mirror 27 operate to transfer rays with the desired polarization passing through the end face 25 out of the side of the slab between the plane 35 and the sidewall 17 to the other side of the slab between the plane 35 and the sidewall 15. The arrows 37 illustrate the paths of two typical axial laser rays which are transferred in this manner from one side of the slab to the other. In a similar manner, axial laser rays with the desired polarization passing through the end face 25 out of the side of the slab between the plane 35 and the sidewall 15 will also be transferred to the other side of the slab between the plane 35 and the sidewall 17 by the action of the calcite plate 29 and the quarter wave plate 31 and the half wave plate 33. At the other end of the slab, the mirror 21 just reflects the axial rays back into the slab 11 along the same path upon which they were travelling prior to the reflection. Thus, each laser ray with the desired polarization will travel back and forth through one side of the slab 11 and then travel back and forth through the other side of the slab 11 and continue to alternate between the sides of the slab.

Because the mirror 27 only coincides with that half of the slab between the plane 35 and the plane of the sidewall 15, laser rays which do not have the desired polarization, that is with their E vector perpendicular to the plane of the paper as seen in FIG. 2 while in the slab 11, will be shifted by the calcite plate 29 out of the laser cavity. As a result, only laser oscillations having the desired polarization in the slab 11 will be present. Thus, the calcite plate 29 functions as a polarizer to limit the laser oscillation to those which provide minimum beam divergence.

Because the rays are laterally transferred by the calcite plate 29, the rays which are near the sidewall of the slab on one side of the slab will be near the center of the slab when travelling through the slab on the other side of the slab. Moreover, since each ray is laterally transferred by an amount equal to one half the slab width, the distance that each ray is from the sidewall on one side of the slab will be equal to the distance that this ray is from the center plane 35 on the other side of the slab.

The flashlamps 19 in addition to exciting the laser material of the slab 11 also introduces heat into the slab 11 substantially uniformly per unit volume of the slab. Heat, however, is removed from the slab only through the surfaces of the slab. Since the larger surfaces are the surfaces 15 and 17, most of the heat is removed from the slab through these surfaces. This condition results in a thermal gradient being built up in the slab 11 which is approximately one dimensional perpendicular to the plane 35 with the locus of higher temperature being at the plane 35. The index of refraction of the laser glass varies with the temperature, with the highest index of refraction being where the temperature is highest and the lowest index of refraction being where the temperature is lowest. Thus, the one dimensional thermal gradient in the slab 11 will cause a one dimensional gradient in the index of refraction of the slab 11 with the longest optical path being on the center plane 35 and the shortest optical paths being near the sidewalls 15 and 17. This gradient in the index of refraction will make the slab 11 act as a cylindrical lens tending to focus the laser light energy on the plane 35. However, because of the lateral shifting of the rays with the desired polarization provided by the calcite plate 29, whereby the rays which are near the sidewall of the slab 11 when passing through one side of the slab pass through the other side of the slab near the center of the slab and vice versa, all of the rays will travel substantially the same optical distance in the slab 11 after passing through both sides of the slab. Accordingly, the cylindrical lens effect of the slab for these rays is cancelled out. Thus, the problem of thermal lensing is overcome by using a laser rod in the form of a slab to achieve a cylindrical lensing effect and by using the calcite plate and the quarter and half wave plates to laterally shift the rays.

The above description is of a preferred embodiment of the invention and many modifications may be made thereof without departing from the spirit and scope of the invention which is defined in the appended claims.

I claim:

1. A laser system comprising an elongated slab of laser material having an axis of symmetry extending parallel to the longitudinal dimensions thereof, means to irradiate said slab with pump light through the larger sidewalls thereof, a reflector positioned opposite one end face of said slab to reflect laser rays travelling through said slab parallel to said axis back into said slab, and ray shifting means positioned opposite the other end face of said slab to reflect laser rays travelling through said slab parallel to said axis back into said slab and to shift the rays which are near the center of said slab to be near the sidewalls of said slab and vice versa.

2. A laser system as recited in claim 1 wherein said ray shifting means shifts each ray so that after being shifted such ray is the same distance from a larger sidewall of said slab that such ray prior to being shifted was from a center plane passing through the middle of said slab parallel to said larger sidewalls.

3. A laser system as recited in claim 1 wherein said ray shifting means shifts the rays from one side of said slab to the other, said sides of said slab being divided by a center plane passing through the middle of said slab parallel to said larger sidewalls.

4. A laser system as recited in claim 3 wherein said ray shifting means comprises a second reflector facing said other end face of said slab, a calcite plate between said reflector and said slab oriented to laterally shift rays which are polarized so that their E vectors are perpendicular to said center plane, first polarization rotating means to rotate 90° the polarization of laser rays travelling parallel to said axis between said center plane and the plane of one of said larger sidewalls as such laser rays travel between said calcite plate and said other end face of said slab, and second polarization rotating means to rotate 90° the polarization of lazer rays travelling parallel to said axis between said center plane and the plane of the other sidewall of said slab as such rays travel from said calcite plate to said second reflector and back.

5. A laser system as recited in claim 4 wherein said calcite plate laterally shifts the rays by an amount equal to half the thickness of said slab.

6. A laser system as recited in claim 4 wherein said first polarization rotating means comprises a half wave plate positioned between said calcite plate and said other end face of said slab and extending only from said center plane to the plane of one of said sidewalls, and wherein said second polarization rotating means comprises a quarter wave plate positioned between said calcite plate and said second reflector.

7. A laser system as recited in claim 4 wherein said second reflector is parallel to said end face and is coextensive only with the half of said end face between said center plane and the plane of said other sidewall.

8. A laser system as recited in claim 1 wherein said laser material is laser glass.

9. A laser system as recited in claim 1 including means to polarize the laser oscillations generated by said system to have their E vectors to be parallel to said larger sidewalls.

10. A laser system comprising an elongated block of laser material having an axis of symmetry extending parallel to the longitudinal dimension thereof, means to pump said laser material in a manner to generate an approximately one dimensional thermal gradient in said block with the locus of high temperature being on a plane passing through the middle of said block parallel to a pair of sidewalls of said block, a reflector positioned opposite an end face of said block to reflect laser rays travelling through said block parallel to said axis back into said block, and ray shifting means opposite the other end face of said block to reflect the rays travelling through said block parallel to said axis back into said block and to laterally shift the rays near said center plane to be near said sidewalls and vice versa.

11. A laser system as recited in claim 10 wherein said laser material is laser glass.

12. A laser system as recited in claim 10 wherein said ray shifting means shifts the rays laterally in a manner so that the distance that each ray is from the center plane before being shifted is equal to the distance that such ray is from a sidewall of said block after such ray has been shifted.

13. A laser system comprising an elongated slab of laser material, means to excite said laser material, reflector means defining a laser cavity running through said slab parallel to the longitudinal dimension of said slab whereby laser oscillations are generated in said cavity through said slab, and means to polarize said laser oscillations so that their E vectors in said slab are parallel to the larger sidewalls of said slab.

14. A laser system as recited in claim 13 wherein said laser material is laser glass.

* * * * *